US008346908B1

(12) United States Patent
Vanyukhin et al.

(10) Patent No.: US 8,346,908 B1
(45) Date of Patent: *Jan. 1, 2013

(54) IDENTITY MIGRATION APPARATUS AND METHOD

(75) Inventors: Nikolay Vanyukhin, St. Petersburg (RU); Oleg Shevnin, St. Petersburg (RU); Alexey Korotich, St. Petersburg (RU)

(73) Assignee: Quest Software, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/324,874

(22) Filed: Dec. 13, 2011

Related U.S. Application Data

(63) Continuation of application No. 11/928,887, filed on Oct. 30, 2007, now Pat. No. 8,086,710.

(60) Provisional application No. 60/863,569, filed on Oct. 30, 2006.

(51) Int. Cl.
*G06F 15/173* (2006.01)
(52) U.S. Cl. .......................... 709/223; 709/218; 709/219
(58) Field of Classification Search .................. 709/218, 709/219, 223
See application file for complete search history.

(56) References Cited

U.S. PATENT DOCUMENTS

| | | | |
|---|---|---|---|
| 4,109,237 A | 8/1978 | Hill | |
| 4,370,707 A | 1/1983 | Phillips et al. | |
| 4,694,397 A | 9/1987 | Grant | |
| 5,222,018 A | 6/1993 | Sharpe et al. | |
| 5,267,865 A | 12/1993 | Lee et al. | |
| 5,302,132 A | 4/1994 | Corder | |
| 5,310,349 A | 5/1994 | Daniels et al. | |
| 5,313,465 A | 5/1994 | Perlman et al. | |
| 5,333,302 A | 7/1994 | Hensley et al. | |
| 5,339,435 A | 8/1994 | Lubkin et al. | |
| 5,367,698 A | 11/1994 | Webber et al. | |
| 5,371,852 A | 12/1994 | Attanasio et al. | |
| 5,387,104 A | 2/1995 | Corder | |
| 5,410,703 A | 4/1995 | Nilsson et al. | |
| 5,423,032 A | 6/1995 | Byrd et al. | |
| 5,437,027 A | 7/1995 | Bannon et al. | |

(Continued)

FOREIGN PATENT DOCUMENTS

EP 1 932 279 A2 6/2008

(Continued)

OTHER PUBLICATIONS

Oct. 26, 2011, U.S. Appl. No. 95/001,458—Office Action—Transmittal of Communications to Third Party Requester Inter Partes Reexamination, 52 pages, Oct. 29, 2011.

(Continued)

*Primary Examiner* — Mohamed Wasel
(74) *Attorney, Agent, or Firm* — Knobbe Martens Olson & Bear LLP

(57) ABSTRACT

An identity migration program provides interfaces for a user to manage operations for migrating locally-managed identities to centrally-managed identities. The provided interfaces include a project management interface, an identity selection interface, a migration rule editor interface, and a project scheduling interface. In certain embodiments, the identity migration program includes a communication module that provides interfaces for managing communication between the identity migration program and locally-managed and centrally-managed servers. Interfaces may also be provided to manage identity group migration and migration error resolution. A migration process management interface enables the user to halt, roll back, or resume a migration project.

20 Claims, 10 Drawing Sheets

U.S. PATENT DOCUMENTS

| | | | |
|---|---|---|---|
| 5,437,555 A | 8/1995 | Ziv-el | |
| 5,440,719 A | 8/1995 | Hanes et al. | |
| 5,441,415 A | 8/1995 | Lee et al. | |
| 5,497,486 A | 3/1996 | Stolfo et al. | |
| 5,497,492 A | 3/1996 | Zbikowski et al. | |
| 5,499,379 A | 3/1996 | Tanaka et al. | |
| 5,530,829 A | 6/1996 | Beardsley et al. | |
| 5,550,968 A | 8/1996 | Miller et al. | |
| 5,550,976 A | 8/1996 | Henderson et al. | |
| 5,553,291 A | 9/1996 | Tanaka et al. | |
| 5,586,304 A | 12/1996 | Stupek, Jr. et al. | |
| 5,590,360 A | 12/1996 | Edwards | |
| 5,600,833 A | 2/1997 | Senn et al. | |
| 5,608,874 A | 3/1997 | Ogawa et al. | |
| 5,608,903 A | 3/1997 | Prasad et al. | |
| 5,613,090 A | 3/1997 | Willems | |
| 5,623,601 A | 4/1997 | Vu | |
| 5,630,069 A | 5/1997 | Flores et al. | |
| 5,630,131 A | 5/1997 | Palevich et al. | |
| 5,659,735 A | 8/1997 | Parrish et al. | |
| 5,659,736 A | 8/1997 | Hasegawa et al. | |
| 5,666,502 A | 9/1997 | Capps et al. | |
| 5,671,428 A | 9/1997 | Muranaga et al. | |
| 5,673,386 A | 9/1997 | Batra | |
| 5,673,387 A | 9/1997 | Chen et al. | |
| 5,675,782 A | 10/1997 | Montague et al. | |
| 5,677,997 A | 10/1997 | Talatik | |
| 5,680,586 A | 10/1997 | Elkins et al. | |
| 5,684,950 A | 11/1997 | Dare et al. | |
| 5,692,132 A | 11/1997 | Hogan | |
| 5,692,902 A | 12/1997 | Aeby | |
| 5,694,540 A | 12/1997 | Humelsine et al. | |
| 5,706,502 A | 1/1998 | Foley et al. | |
| 5,708,812 A | 1/1998 | Van Dyke et al. | |
| 5,708,828 A | 1/1998 | Coleman | |
| 5,710,884 A | 1/1998 | Dedrick | |
| 5,711,671 A | 1/1998 | Geeslin et al. | |
| 5,724,521 A | 3/1998 | Dedrick | |
| 5,727,145 A | 3/1998 | Nessett et al. | |
| 5,727,951 A | 3/1998 | Ho et al. | |
| 5,740,427 A | 4/1998 | Stoller et al. | |
| 5,743,746 A | 4/1998 | Ho et al. | |
| 5,745,113 A | 4/1998 | Jordan et al. | |
| 5,745,902 A | 4/1998 | Miller et al. | |
| 5,752,042 A | 5/1998 | Cole et al. | |
| 5,754,173 A | 5/1998 | Hiura et al. | |
| 5,754,938 A | 5/1998 | Herz et al. | |
| 5,758,062 A | 5/1998 | Mcmahon et al. | |
| 5,758,074 A | 5/1998 | Marlin et al. | |
| 5,758,344 A | 5/1998 | Prasad et al. | |
| 5,764,897 A | 6/1998 | Khalidi | |
| 5,765,140 A | 6/1998 | Knudson et al. | |
| 5,768,519 A | 6/1998 | Swift et al. | |
| 5,774,551 A | 6/1998 | Wu et al. | |
| 5,778,169 A | 7/1998 | Reinhardt | |
| 5,784,553 A | 7/1998 | Kolawa et al. | |
| 5,784,643 A | 7/1998 | Shields | |
| 5,790,801 A | 8/1998 | Funato | |
| 5,796,393 A | 8/1998 | Macnaughton et al. | |
| 5,806,075 A | 9/1998 | Jain et al. | |
| 5,812,669 A | 9/1998 | Jenkins et al. | |
| 5,812,865 A | 9/1998 | Theimer et al. | |
| 5,815,657 A | 9/1998 | Williams et al. | |
| 5,819,265 A | 10/1998 | Ravin et al. | |
| 5,819,281 A | 10/1998 | Cummins | |
| 5,819,295 A | 10/1998 | Nakagawa et al. | |
| 5,822,518 A | 10/1998 | Ooki et al. | |
| 5,835,087 A | 11/1998 | Herz et al. | |
| 5,835,911 A | 11/1998 | Nakagawa et al. | |
| 5,838,918 A | 11/1998 | Prager et al. | |
| 5,844,508 A | 12/1998 | Murashita et al. | |
| 5,848,396 A | 12/1998 | Gerace | |
| 5,859,972 A | 1/1999 | Subramaniam et al. | |
| 5,872,928 A | 2/1999 | Lewis et al. | |
| 5,872,973 A | 2/1999 | Mitchell et al. | |
| 5,878,432 A | 3/1999 | Misheski et al. | |
| 5,889,520 A | 3/1999 | Glaser | |
| 5,890,161 A | 3/1999 | Helland et al. | |
| 5,890,175 A | 3/1999 | Wong et al. | |
| 5,892,898 A | 4/1999 | Fujii et al. | |
| 5,893,074 A | 4/1999 | Hughes et al. | |
| 5,893,076 A | 4/1999 | Hafner et al. | |
| 5,893,916 A | 4/1999 | Dooley | |
| 5,930,512 A | 7/1999 | Boden et al. | |
| 5,937,165 A | 8/1999 | Schwaller et al. | |
| 5,948,064 A | 9/1999 | Bertram et al. | |
| 5,949,419 A | 9/1999 | Domine et al. | |
| 5,956,732 A | 9/1999 | Tsuchida | |
| 5,956,736 A | 9/1999 | Hanson et al. | |
| 5,960,200 A | 9/1999 | Eager et al. | |
| 5,987,247 A | 11/1999 | Lau | |
| 5,995,114 A | 11/1999 | Wegman et al. | |
| 6,002,868 A | 12/1999 | Jenkins et al. | |
| 6,003,047 A | 12/1999 | Osmond et al. | |
| 6,014,669 A | 1/2000 | Slaughter et al. | |
| 6,014,712 A | 1/2000 | Islam et al. | |
| 6,016,495 A | 1/2000 | Mckeehan et al. | |
| 6,016,501 A | 1/2000 | Martin et al. | |
| 6,021,496 A | 2/2000 | Dutcher et al. | |
| 6,029,178 A | 2/2000 | Martin et al. | |
| 6,029,195 A | 2/2000 | Herz | |
| 6,029,247 A | 2/2000 | Ferguson | |
| 6,035,323 A | 3/2000 | Narayen et al. | |
| 6,041,344 A | 3/2000 | Bodamer et al. | |
| 6,044,368 A | 3/2000 | Powers | |
| 6,044,465 A | 3/2000 | Dutcher et al. | |
| 6,049,822 A | 4/2000 | Mittal | |
| 6,052,512 A | 4/2000 | Peterson et al. | |
| 6,055,538 A | 4/2000 | Kessenich et al. | |
| 6,058,260 A | 5/2000 | Brockel et al. | |
| 6,058,379 A | 5/2000 | Odom et al. | |
| 6,061,643 A | 5/2000 | Walker et al. | |
| 6,061,650 A | 5/2000 | Malking et al. | |
| 6,067,568 A | 5/2000 | Li et al. | |
| 6,070,184 A | 5/2000 | Blount et al. | |
| 6,076,166 A | 6/2000 | Moshfeghi et al. | |
| 6,079,020 A | 6/2000 | Liu | |
| 6,092,199 A | 7/2000 | Dutcher et al. | |
| 6,101,481 A | 8/2000 | Miller | |
| 6,101,503 A | 8/2000 | Cooper et al. | |
| 6,108,649 A | 8/2000 | Young et al. | |
| 6,108,670 A | 8/2000 | Weida et al. | |
| 6,112,228 A | 8/2000 | Earl et al. | |
| 6,112,240 A | 8/2000 | Pogue et al. | |
| 6,115,040 A | 9/2000 | Bladow et al. | |
| 6,115,544 A | 9/2000 | Mueller | |
| 6,134,548 A | 10/2000 | Gottsman et al. | |
| 6,137,869 A | 10/2000 | Voit et al. | |
| 6,138,086 A | 10/2000 | Rose et al. | |
| 6,141,006 A | 10/2000 | Knowlton et al. | |
| 6,141,010 A | 10/2000 | Hoyle | |
| 6,141,647 A | 10/2000 | Meijer et al. | |
| 6,151,600 A | 11/2000 | Dedrick | |
| 6,151,610 A | 11/2000 | Senn et al. | |
| 6,161,176 A | 12/2000 | Hunter et al. | |
| 6,167,445 A | 12/2000 | Gai et al. | |
| 6,167,564 A | 12/2000 | Fontana et al. | |
| 6,170,009 B1 | 1/2001 | Mandal et al. | |
| 6,182,212 B1 | 1/2001 | Atkins et al. | |
| 6,182,226 B1 | 1/2001 | Reid et al. | |
| 6,185,625 B1 | 2/2001 | Tso et al. | |
| 6,195,794 B1 | 2/2001 | Buxton | |
| 6,199,068 B1 | 3/2001 | Carpenter | |
| 6,199,079 B1 | 3/2001 | Gupta et al. | |
| 6,202,051 B1 | 3/2001 | Woolston | |
| 6,205,480 B1 | 3/2001 | Broadhurst et al. | |
| 6,208,345 B1 | 3/2001 | Sheard et al. | |
| 6,209,000 B1 | 3/2001 | Klein et al. | |
| 6,209,033 B1 | 3/2001 | Datta et al. | |
| 6,222,535 B1 | 4/2001 | Hurd, II | |
| 6,223,221 B1 | 4/2001 | Kunz | |
| 6,226,649 B1 | 5/2001 | Bodamer et al. | |
| 6,230,160 B1 | 5/2001 | Chan et al. | |
| 6,230,184 B1 | 5/2001 | Chan et al. | |
| 6,230,309 B1 | 5/2001 | Turner et al. | |
| 6,233,584 B1 | 5/2001 | Purcell | |
| 6,237,114 B1 | 5/2001 | Wookey et al. | |

| Patent No. | Date | Inventor |
|---|---|---|
| 6,246,410 B1 | 6/2001 | Bergeron et al. |
| 6,249,905 B1 | 6/2001 | Yoshida et al. |
| 6,256,637 B1 | 7/2001 | Venkatesh et al. |
| 6,256,659 B1 | 7/2001 | Mclain, Jr. et al. |
| 6,256,678 B1 | 7/2001 | Traughber et al. |
| 6,260,068 B1 | 7/2001 | Zalewski et al. |
| 6,263,352 B1 | 7/2001 | Cohen |
| 6,266,666 B1 | 7/2001 | Ireland et al. |
| 6,269,405 B1 | 7/2001 | Dutcher et al. |
| 6,269,406 B1 | 7/2001 | Dutcher et al. |
| 6,272,673 B1 | 8/2001 | Dale et al. |
| 6,272,678 B1 | 8/2001 | Imachi et al. |
| 6,279,030 B1 | 8/2001 | Britton et al. |
| 6,282,576 B1 | 8/2001 | Lane |
| 6,282,605 B1 | 8/2001 | Moore |
| 6,286,028 B1 | 9/2001 | Cohen et al. |
| 6,286,104 B1 | 9/2001 | Buhle et al. |
| 6,301,601 B1 | 10/2001 | Helland et al. |
| 6,304,893 B1 | 10/2001 | Gish |
| 6,308,164 B1 | 10/2001 | Nummelin et al. |
| 6,308,188 B1 | 10/2001 | Bernardo et al. |
| 6,308,273 B1 | 10/2001 | Goertzel et al. |
| 6,313,835 B1 | 11/2001 | Gever et al. |
| 6,314,434 B1 | 11/2001 | Shigemi et al. |
| 6,327,677 B1 | 12/2001 | Garg et al. |
| 6,330,566 B1 | 12/2001 | Durham |
| 6,336,118 B1 | 1/2002 | Hammond |
| 6,341,287 B1 | 1/2002 | Sziklai et al. |
| 6,345,239 B1 | 2/2002 | Bowman-amuah |
| 6,349,287 B1 | 2/2002 | Hayashi |
| 6,363,398 B1 | 3/2002 | Andersen |
| 6,370,573 B1 | 4/2002 | Bowman Amuah |
| 6,370,646 B1 | 4/2002 | Goodman et al. |
| 6,381,579 B1 | 4/2002 | Gervais et al. |
| 6,389,589 B1 | 5/2002 | Mishra et al. |
| 6,401,085 B1 | 6/2002 | Gershman et al. |
| 6,401,211 B1 | 6/2002 | Brezak et al. |
| 6,405,364 B1 | 6/2002 | Bowman-amuah |
| 6,430,556 B1 | 8/2002 | Goldberg et al. |
| 6,438,514 B1 | 8/2002 | Hill et al. |
| 6,442,620 B1 | 8/2002 | Thatte et al. |
| 6,446,096 B1 | 9/2002 | Holland et al. |
| 6,453,317 B1 | 9/2002 | Lacost et al. |
| 6,457,130 B2 | 9/2002 | Hitz et al. |
| 6,466,932 B1 | 10/2002 | Dennis et al. |
| 6,469,713 B2 | 10/2002 | Hetherington et al. |
| 6,473,794 B1 | 10/2002 | Guheen et al. |
| 6,496,847 B1 | 12/2002 | Bugnion et al. |
| 6,587,876 B1 | 7/2003 | Mahon et al. |
| 6,615,258 B1 | 9/2003 | Barry et al. |
| 6,625,622 B1 | 9/2003 | Henrickson et al. |
| 6,658,625 B1 | 12/2003 | Allen |
| 6,678,714 B1 | 1/2004 | Olapurath et al. |
| 6,715,128 B1 | 3/2004 | Hirashima et al. |
| 6,728,877 B2 | 4/2004 | Mackin et al. |
| 6,735,691 B1 | 5/2004 | Capps et al. |
| 6,757,696 B2 | 6/2004 | Multer et al. |
| 6,760,761 B1 | 7/2004 | Sciacca |
| 6,795,835 B2 | 9/2004 | Ricart et al. |
| 6,801,946 B1 | 10/2004 | Child et al. |
| 6,817,017 B2 | 11/2004 | Goodman |
| 6,839,766 B1 | 1/2005 | Parnafes et al. |
| 6,880,005 B1 | 4/2005 | Bell et al. |
| 6,925,477 B1 | 8/2005 | Champagne et al. |
| 6,938,158 B2 | 8/2005 | Azuma |
| 6,941,465 B1 | 9/2005 | Palekar et al. |
| 6,944,183 B1 | 9/2005 | Iyer et al. |
| 6,950,818 B2 | 9/2005 | Dennis et al. |
| 6,950,935 B1 | 9/2005 | Allavarpu et al. |
| 6,968,370 B2 | 11/2005 | Wu |
| 6,973,488 B1 | 12/2005 | Yavatkar et al. |
| 6,976,090 B2 | 12/2005 | Ben-Shaul et al. |
| 7,028,079 B2 * | 4/2006 | Mastrianni et al. ............ 709/217 |
| 7,062,781 B2 | 6/2006 | Shambroom |
| 7,080,077 B2 | 7/2006 | Ramamurthy et al. |
| 7,089,584 B1 | 8/2006 | Sharma |
| 7,100,195 B1 | 8/2006 | Underwood |
| 7,117,486 B2 | 10/2006 | Wong et al. |
| 7,133,984 B1 | 11/2006 | Dickensheets |
| 7,139,973 B1 | 11/2006 | Kirkwood et al. |
| 7,143,095 B2 | 11/2006 | Barrett et al. |
| 7,162,640 B2 | 1/2007 | Heath et al. |
| 7,171,458 B2 | 1/2007 | Brown et al. |
| 7,185,073 B1 | 2/2007 | Gai et al. |
| 7,209,970 B1 | 4/2007 | Everson et al. |
| 7,213,266 B1 | 5/2007 | Maher et al. |
| 7,216,181 B1 | 5/2007 | Jannu et al. |
| 7,231,460 B2 | 6/2007 | Sullivan et al. |
| 7,243,370 B2 | 7/2007 | Bobde et al. |
| 7,284,043 B2 | 10/2007 | Feinleib et al. |
| 7,299,504 B1 | 11/2007 | Tiller et al. |
| 7,346,766 B2 | 3/2008 | Mackin et al. |
| 7,356,601 B1 | 4/2008 | Clymer et al. |
| 7,356,816 B2 | 4/2008 | Goodman et al. |
| 7,379,996 B2 | 5/2008 | Papatla et al. |
| 7,418,597 B2 | 8/2008 | Thornton et al. |
| 7,421,555 B2 | 9/2008 | Dorey |
| 7,426,642 B2 | 9/2008 | Aupperle et al. |
| 7,428,583 B1 | 9/2008 | Lortz et al. |
| 7,440,962 B1 | 10/2008 | Wong et al. |
| 7,444,401 B1 | 10/2008 | Keyghobad et al. |
| 7,467,141 B1 | 12/2008 | Steele et al. |
| 7,478,418 B2 | 1/2009 | Supramaniam et al. |
| 7,483,979 B1 | 1/2009 | Prager |
| 7,487,535 B1 | 2/2009 | Isaacson et al. |
| 7,519,813 B1 | 4/2009 | Cox et al. |
| 7,584,502 B2 | 9/2009 | Alkove et al. |
| 7,591,005 B1 | 9/2009 | Moore |
| 7,617,501 B2 | 11/2009 | Peterson et al. |
| 7,650,497 B2 | 1/2010 | Thornton et al. |
| 7,653,794 B2 | 1/2010 | Michael et al. |
| 7,661,027 B2 | 2/2010 | Langen et al. |
| 7,673,323 B1 | 3/2010 | Moriconi |
| 7,690,025 B2 | 3/2010 | Grewal et al. |
| 7,765,187 B2 | 7/2010 | Bergant et al. |
| 7,805,721 B2 | 9/2010 | Feinleib et al. |
| 7,895,332 B2 | 2/2011 | Vanyukhin et al. |
| 7,904,949 B2 | 3/2011 | Bowers et al. |
| 7,987,455 B1 | 7/2011 | Senner et al. |
| 8,024,360 B2 | 9/2011 | Moore |
| 8,087,075 B2 | 12/2011 | Peterson et al. |
| 8,141,138 B2 | 3/2012 | Bhatia et al. |
| 8,245,242 B2 | 8/2012 | Peterson et al. |
| 2001/0034733 A1 | 10/2001 | Prompt et al. |
| 2002/0055949 A1 | 5/2002 | Shiomi et al. |
| 2002/0078005 A1 | 6/2002 | Shi et al. |
| 2002/0112178 A1 | 8/2002 | Scherr |
| 2002/0129274 A1 | 9/2002 | Baskey et al. |
| 2002/0133723 A1 | 9/2002 | Tait |
| 2002/0138572 A1 | 9/2002 | Delany et al. |
| 2002/0169986 A1 | 11/2002 | Lortz |
| 2002/0169988 A1 | 11/2002 | Vandergeest et al. |
| 2002/0174366 A1 | 11/2002 | Peterka et al. |
| 2002/0178377 A1 | 11/2002 | Hemsath et al. |
| 2002/0184536 A1 | 12/2002 | Flavin |
| 2003/0009487 A1 | 1/2003 | Prabakaran et al. |
| 2003/0018913 A1 | 1/2003 | Brezak et al. |
| 2003/0023587 A1 | 1/2003 | Dennis et al. |
| 2003/0028611 A1 | 2/2003 | Kenny et al. |
| 2003/0033535 A1 | 2/2003 | Fisher et al. |
| 2003/0065940 A1 | 4/2003 | Brezak et al. |
| 2003/0065942 A1 | 4/2003 | Lineman et al. |
| 2003/0110397 A1 | 6/2003 | Supramaniam et al. |
| 2003/0115186 A1 | 6/2003 | Wilkinson et al. |
| 2003/0115313 A1 | 6/2003 | Kanada et al. |
| 2003/0115439 A1 * | 6/2003 | Mahalingam et al. ............ 712/1 |
| 2003/0149781 A1 | 8/2003 | Yared et al. |
| 2003/0177388 A1 | 9/2003 | Botz et al. |
| 2003/0188036 A1 | 10/2003 | Chen et al. |
| 2003/0229783 A1 | 12/2003 | Hardt |
| 2004/0010519 A1 | 1/2004 | Sinn et al. |
| 2004/0059953 A1 | 3/2004 | Purnell |
| 2004/0078569 A1 | 4/2004 | Hotti |
| 2004/0088543 A1 | 5/2004 | Garg et al. |
| 2004/0098595 A1 | 5/2004 | Aupperle et al. |
| 2004/0098615 A1 | 5/2004 | Mowers et al. |
| 2004/0111515 A1 | 6/2004 | Manion et al. |
| 2004/0111643 A1 | 6/2004 | Farmer |

| | | | |
|---|---|---|---|
| 2004/0117382 A1 | 6/2004 | Houseknecht et al. | |
| 2004/0123146 A1 | 6/2004 | Himmel et al. | |
| 2004/0128542 A1 | 7/2004 | Blakley et al. | |
| 2004/0139050 A1 | 7/2004 | Barrett et al. | |
| 2004/0139081 A1 | 7/2004 | Barrett et al. | |
| 2004/0199795 A1 | 10/2004 | Grewal et al. | |
| 2004/0260565 A1* | 12/2004 | Zimniewicz et al. | 705/1 |
| 2004/0260651 A1 | 12/2004 | Chan et al. | |
| 2005/0010547 A1 | 1/2005 | Carinci et al. | |
| 2005/0055357 A1 | 3/2005 | Campbell | |
| 2005/0060397 A1 | 3/2005 | Barthram et al. | |
| 2005/0086457 A1* | 4/2005 | Hohman | 713/1 |
| 2005/0091068 A1 | 4/2005 | Ramamoorthy et al. | |
| 2005/0091213 A1 | 4/2005 | Schutz et al. | |
| 2005/0091250 A1 | 4/2005 | Dunn et al. | |
| 2005/0091284 A1 | 4/2005 | Weissman et al. | |
| 2005/0091290 A1 | 4/2005 | Cameron et al. | |
| 2005/0108579 A1 | 5/2005 | Isaacson et al. | |
| 2005/0114701 A1 | 5/2005 | Atkins et al. | |
| 2005/0125798 A1 | 6/2005 | Peterson | |
| 2005/0144463 A1 | 6/2005 | Rossebo et al. | |
| 2005/0193181 A1 | 9/2005 | Kaneda et al. | |
| 2005/0198303 A1 | 9/2005 | Knauerhase et al. | |
| 2005/0204143 A1 | 9/2005 | Ellington | |
| 2005/0223216 A1 | 10/2005 | Chan et al. | |
| 2005/0246554 A1 | 11/2005 | Batson | |
| 2005/0267938 A1* | 12/2005 | Czeczulin | 709/206 |
| 2005/0268309 A1 | 12/2005 | Krishnaswamy et al. | |
| 2005/0283443 A1 | 12/2005 | Hardt | |
| 2005/0283614 A1 | 12/2005 | Hardt | |
| 2006/0004794 A1 | 1/2006 | Pizzo et al. | |
| 2006/0005229 A1 | 1/2006 | Palekar et al. | |
| 2006/0010445 A1 | 1/2006 | Peterson et al. | |
| 2006/0021017 A1 | 1/2006 | Hinton et al. | |
| 2006/0026195 A1 | 2/2006 | Gu et al. | |
| 2006/0034494 A1 | 2/2006 | Holloran | |
| 2006/0085483 A1 | 4/2006 | Mooney et al. | |
| 2006/0116949 A1* | 6/2006 | Wehunt et al. | 705/35 |
| 2006/0130065 A1 | 6/2006 | Chin et al. | |
| 2006/0161435 A1 | 7/2006 | Atef et al. | |
| 2006/0174350 A1 | 8/2006 | Roever et al. | |
| 2006/0184401 A1* | 8/2006 | DelGaudio et al. | 705/7 |
| 2006/0200424 A1 | 9/2006 | Cameron et al. | |
| 2006/0200504 A1 | 9/2006 | Lo | |
| 2006/0224611 A1 | 10/2006 | Dunn et al. | |
| 2006/0248099 A1 | 11/2006 | Barrett et al. | |
| 2006/0265740 A1 | 11/2006 | Clark et al. | |
| 2006/0282360 A1* | 12/2006 | Kahn et al. | 705/35 |
| 2006/0282461 A1 | 12/2006 | Marinescu | |
| 2006/0294151 A1 | 12/2006 | Wong et al. | |
| 2007/0011136 A1 | 1/2007 | Haskin et al. | |
| 2007/0038596 A1 | 2/2007 | Pizzo et al. | |
| 2007/0083917 A1 | 4/2007 | Peterson et al. | |
| 2007/0100980 A1* | 5/2007 | Kataoka et al. | 709/223 |
| 2007/0101415 A1 | 5/2007 | Masui | |
| 2007/0143430 A1 | 6/2007 | Johnson et al. | |
| 2007/0143836 A1 | 6/2007 | Bowers et al. | |
| 2007/0150448 A1 | 6/2007 | Patnode | |
| 2007/0156766 A1 | 7/2007 | Hoang et al. | |
| 2007/0156767 A1 | 7/2007 | Hoang et al. | |
| 2007/0180448 A1 | 8/2007 | Low et al. | |
| 2007/0180493 A1 | 8/2007 | Croft et al. | |
| 2007/0192843 A1 | 8/2007 | Peterson | |
| 2007/0255814 A1 | 11/2007 | Green et al. | |
| 2007/0288992 A1 | 12/2007 | Robinson | |
| 2008/0104220 A1 | 5/2008 | Vanyukhin | |
| 2008/0104250 A1 | 5/2008 | Vanyukhin | |
| 2008/0133533 A1* | 6/2008 | Ganugapati et al. | 707/9 |
| 2008/0162604 A1* | 7/2008 | Soulet et al. | 707/204 |
| 2008/0215867 A1 | 9/2008 | Mackin et al. | |
| 2009/0006537 A1 | 1/2009 | Palekar et al. | |
| 2009/0216975 A1 | 8/2009 | Halperin et al. | |
| 2010/0050232 A1 | 2/2010 | Peterson | |
| 2011/0093570 A1 | 4/2011 | Mackin et al. | |
| 2011/0282977 A1 | 11/2011 | Peterson | |
| 2011/0283273 A1 | 11/2011 | Peterson | |
| 2012/0192256 A1 | 7/2012 | Peterson et al. | |

FOREIGN PATENT DOCUMENTS

| | | |
|---|---|---|
| WO | WO 2006/016900 | 2/2006 |
| WO | WO 2007/044613 A2 | 4/2007 |

OTHER PUBLICATIONS

Nov. 18, 2011, U.S. Appl. No. 95/001,458—Patent Owner Comments Regarding Oct. 20, 2011 Action Closing Prosecution, 14 pages.

Affidavit filed with Amendment and Response to Office Action filed Jan. 14, 2008 in U.S. Appl. No. 10/888,845.

Amendment and Response to Office Action filed on Jan. 14, 2008 with claims as amended in U.S. Appl. No. 10/888,845.

Dennis, Disconnect Login (Was: FC3 Bug Week—Help Wanted) (Sep. 24, 2004). http:/markmail.org/message/cd462ufl2baup3yz.

Documentation for Kerberos V5 release krb5-1.3, Copyright 1985-2002, Installation Guide: http://web.mit.edu/Kerberoslkrb5-1.3/krb5-1.3/doc/krb5-install.html—System Administrator's Guide: http://web.mit.edu/Kerberos/krb5-1.3/krb5-1.3/doc/krb5-admin.html—UNIX User's Guide: http://web.mit.edu/Kerberos/krb5-1.3/krb5-1.3/doc/krb5- er.html.

Garman, "Kerberos—The Definitive Guide," Aug. 2003, O'Reilly & Associates, Inc.

PADL Software Pty Ltd., Pam_ccreds readme, (Apr. 11, 2004) (pan_crreds) http://web.archive.org/web/20040411154827/htt;://www.padl.com/OSS/pam_ccreds.html.

Request for Withdrawal of the European Application No. 05728119.8 on Feb. 19, 2010.

Response to Communication pursuant to Article 94(3) EOC filed Sep. 9, 2009 in EP 05728119.8.

Summary of telephonic interview involving co-inventor Matthew Peterson and three others plus the Examine on Nov. 16, 2007 in U.S. Appl. No. 10/888,845.

U.S. Appl. No. 11/311,215, Amendment and Response to Office Action filed Jun. 14, 2010.

U.S. Appl. No. 11/311,215, Claims in "red-line" form as amended by the applicant which with the amendments by the Examiner resulted in the issuance of the Notice of Allowance, Dec. 19, 2005.

U.S. Appl. No. 11/311,215, Claims in "red-line" form as amended by the Examiner resulted in the issuance of the Notice of Allowance.

U.S. Appl. No. 95/001,458, Inter Partes Reexamination Office Action, dated Jan. 21, 2011 of co-owned U.S. Patent No. 7,617,501.

Withers, Integrating Windows 2000 and UNIX Using Kerberos, The Journal for UNIX Systems Administrators, vol. 10, No. 12, Dec. 2001. http://seann.herdejurgen.com/resume/samag.com/html/v10/i12/a5.htm.

Aelita Software Domain Migration Wizard 6.0 User's Guide, Aug. 21, 2003.

Centrify DirectControl Administrator's Guide Version 2.0, Aug. 15, 2005.

Declaration of Nicholas Webb, dated Apr. 13, 2012.

U.S. Appl. No. 11/928,887, Amendment and Response to Office Action mailed on Nov. 27, 2009, Response dated Mar. 1, 2010.

U.S. Appl. No. 11/928,887, Notice of Allowance dated Dec. 13, 2010.

U.S. Appl. No. 11/928,887, Response to May 25, 2010 Final Office Action, Response dated Aug. 13, 2010.

U.S. Appl. No. 12/200,814, filed Aug. 28, 2008, Eyes et al.

"Description of Digital Certificates", Jan. 23, 2007, http://www.support.microsoft.com/kb/195724.

"Directory Administrator", http://diradmin.open-it.org/indexlphp, p. 1-3. Dec. 15, 2004.

"Innovation Report—Windows Group Policy Protocols". Jul. 31, 2006.

"Kerberos Module for Apache", http://modauthkerb.sourceforge.net/.

"LDAP Linux HOWTO", http://tldp/org/HOWTO/LDAP-HOWTO/, p. 1-2. Mar. 5, 2004.

"Lnux Authentication Against Active Directory", http://laaad/sourceforge.netlen/home/htm, p. 1-2. Dec. 15, 2004.

"NegotiateAuth", http://negotiateauth,mozdev.org/ Jul. 8, 2010.

"Optimization Techniques for Trusted Semantic Interoperation", Final Technical Report, Air Force Research Laboratory. Published May 1998.

"PADL Software Pty Ltd" http://www.padl.com/productsIXAD.html, pp. 1-3. Dec. 15, 2004.

"Project: AD4Unix: Summary", http://sourceforge.netlprojects/adunixl, p. 1-3. Dec. 15, 2004.

"Replacing NIS with Kerberos and LDAP", http://ofb.netHhess/krbldap/, p. 1-2. Dec. 15, 2004.

"Sadma", http://sadmas.sourceforge.netlen/indexlhtml. p. 1-2. Dec. 15, 2004.

"Sun Enterprise Authentication Mechanism Data Sheet", http://wwws.sun.com/jsp_utils/Printpage.jsp?url, pp. 1-4. Dec. 15, 2004.

Vintela Extends the Reach of Microsoft Group Policy to Unix and Linux; Vintela Group Policy (VGP) Provides a Framework for Unix and Linux Policy-Based Management Through the Popular Windows Group Policy System., PR Newswire, Sep. 13, 2004.

A. Leonard, "Embrace, extend, censor", Originally published May 11, 2000 on salon.com, http://archive.salon.com/tech/log/2000/05/11/slashdot_censor/.

Accelerated Examination Support Document in newly filed application.

AIX 5L Differences Guide Version 5.2 Edition Published Dec. 24, 2002, Excerpt http://proquest.safaribooksonline.com/0738427047/ch09lev1sec13.

Akhgar et al., Secure ICT Services for Mobile and Wireless Communications: A Federated Global Identity Management Framework, 2006 IEEE.

Alan H. Harbitter et al., "Performance of Public-Key-Enabled Kerberos Authentication in Large Networks", Proceedings of the IEEE symposium on Security and Privacy. 2001.

Antti Tikkanen, "Active Directory and nss_idap for Linux: Centralized er Management," printed from http://www.hut.fi/cc/docskerberos/nss_ldap/htm, pp. 1-11, 2004.

Apurva Kumar, "The OpenLDAP Proxy Cache," IBM, India Research Lab, at least as early as May 2003.

Buell, D.A. et al., "Identity management", Internet Computing, IEEE vol. 7, Issue 6, Nov.-Dec. 2003 pp. 26-28.

Centrify Corporation's Answer and Affirmative Defenses, *Quest Software, Inc. v. Centrify Corporation and Likewise Software, Inc.*, Case No. 2:10-CV-00859-TS, United States District Court for the District of Utah, Central Division.

Chapter 9 Authentication Protocols, Distributed System & Network Security Lab, Department of Computer Science & Information Engineering, National Chiao Tung University, pp. 21-22. 1991.

Complaint, *Quest Software, Inc. v. Centrify Corporation and Likewise Software, Inc.*, Case No. 2:10-cv-00859-TS, United States District Court for the District of Utah, Central Division.

COSuser—Identity management and user provisioning for Unix, Linux and Microsoft Windows® http://www.cosuser.com/ May 24, 2010.

Damiani, E., et al, "Managing multiple and dependable identities" Internet Computing, IEEE vol. 7, Issue 6, Nov.-Dec. 2003 pp. 29-37.

David "Del" Elson, "Active Directory and Linux," printed from http://www.securityfoc.com/printable/infoc /1563, pp. 1-11, 2002.

David F. Carr, "What's Federated Identity Management?", eWeek, Nov. 10, 2003, http://www.eweek.com/printarticle/0,1761.a-111811,00.asp.

Declaration of Matthew Peterson in Support of Quest's Opposition to Centrify's Motion to Transfer Venue to the Northern District of California, *Quest Software, Inc. v. Centrify Corporation and Likewise Software, Inc.*, Case No. 2:10-cv-00859-TS, United States District Court for the District of Utah, Central Division.

Description of Digital Certificates, Jan. 23, 2007, available at http://www.support.microsoft.com/kb/195724.

Designing Network Security Published May 7, 1999. Excerpt http://proquest.safaribooksonline.com/1578700434/ch021ev1sec1.

Documentation for Kerberos V5 release krb5-1.3, Copyright 1985-2002, Installation Guide: http://web.mit.edu/Kerberos/krb5-1.6/krb5-1.6/doc/krb5-install.html.

Documentation for Kerberos V5 release krb5-1.3, Copyright 1985-2002, System Administrator's Guide: http://web.mit.edu/Kerberos/krb5-1.6/krb5-1.6/doc/krb5-admin.html.

Documentation for Kerberos V5 release krb5-1.3, Copyright 1985-2002, UNIX User's Guide: http://web.mit.edu/kerberos/www/krb5-1.2/krb5-1.2.6/doc/user-guide.html.

European Office Action, Application No. 05728119.8-1243 dated Apr. 9, 2009.

European Patent Office Communication pursuant to Article 94(3) EPC dated Apr. 9, 2009.

Fabini et al., "IMS in a Bottle: Initial Experiences from an OpenSER-based Prototype Implementation of the 3GPP IP Multimedia Subsystem" Mobile Business, 2006. ICMB '06. International Conference on Publication Date: 2006; on pp. 13-13.

Get to One Options for moving from multiple, Unix identities to a single, AD-based authentication infrastructure with Vintela Authentication Serviceshttp://www.quest.com/Vintela_Authentication_Services/migration_options_VAS.aspx May 24, 2010.

Hank Simon, "SAML:The Secret to Centralized Identity Management", Dec. 2004, http://intelligententerprise.com/showArticle.jhtml?articleID=54200324.

Identity Management for UNIX http://technet2.microsoft.com/WindowsServer/en/library/ab66b7d2-9cfb-4d76-b707-30a5e0dd84f31033.mspx?mfr=true Aug. 22, 2005.

Implementing Registry-Based Group Policy for Applications, Microsoft Windows 2000 Server. White Paper. 2000.

International Preliminary Report on Patentability and Written Opinion for International Application No. PCT/US2006/039302, mailed on Apr. 2, 2009, in 7 pages.

International Search Report and Written Opinion from International Patent Appl. No. PCT/US2009/038394, mailed Oct. 6, 2009, in 13 pages.

International Search Report in International Application No. PCT/US2006/039302, mailed on Jul. 3, 2008.

International Search Report PCT/US2005/008342, mailed on Nov. 9, 2006.

Introduction to Group Policy in Windows Server 2003, Microsoft Corporation, Published Apr. 2003.

J. Barr, "The Gates of Hades: Microsoft attempts to co-opt Kerberos", Published Apr. 2000 as verified by the Internet Archive, http://web.archive.org/web/20000619011652/http://www.linuxworld.com/linuxworld/lw-2000-04/lw-04-vcontrol_3.html.

J. Brezak, "HTTP Authentication: SPNEGO Access Authentication as Implemented in Microsoft Windows 2000," http://Meta.cesnet.cz/cms/opencms/en/docs/software/devel/draft-brezek-spnego-http-04.xt, pp. 1-6. 2002.

J. Kohl et al. "RFC 1510: The Kerberos Network Authentication Service (V5)", Published Sep. 1993, http://ietfreport.isoc.org/rfc/PDF/rfc1510.pdf.

Jan De Clercq, "Win.NET Server Kerberos", http://www.winnetmag.com/WindowsSecurity/ Articlesl ArticleID/26450/pg/3/3.html. Sep. 17, 2002.

John Brezak, "Interoperability with Microsoft Windows 2000 Active Directory and Kerberos Services," printed from http://msdn.microsft.com/library/en- /dnactdir/html/kerberossamp.asp?frame=true, pp. 1-4, 2000.

Kerberos, PACs, and Microsoft's Dirty Tricks Originally posted to slashdot.org on May 2, 2000, http://slashdot.org/comments.pl?sid=5268&threshold=1&commentsort=O&mode=thread&cid=1096250.

Langella, S. et al., "Dorian: Grid Service Infrastructure for Identity Management and Federation", Computer-Based Medical Systems, 2006. CBMS 2006. 19th IEEE International Symposium on Jun. 22-23, 2006 pp. 756-761.

Li, M., et al., "Identity management in vertical handovers for UMTS-WLAN networks", Mobile Business, 2005. ICMB 2005. International Conference on Jul. 11-13, 2005 pp. 479-484.

Likewise Software, Inc.'s Answer, Affirmative Defenses and Counterclaims, *Quest Software, Inc. v. Centrify Corporation and Likewise Software, Inc.*, Case No. 2:10-CV-00859-TS, United States District Court for the District of Utah, Central Division.

LinuX® and Windows® Interoperability Guide, Published Dec. 14, 2001, Excerpt http://proquest.safaribooksonline.com/0130324779/ch 18/lev1sec3.

Lowe-Norris, Alistair G., Windows 2000 Active Directory, Chapters 8 and 9, pp. 177-245, Jan. 2000.

Matsunaga et al, "Secure Authentication System for Public WLAN Roaming, Proceedings of the 1st ACM international workshop on Wireless mobile applications and services on WLAN hotspots," San Diego, CA, A, Year of Publication: 2003, p. 113-121.

Matthew Hur, "Session Code: ARC241 architecture & infrastructure", Microsoft Corporation. Oct. 26, 2003.

MCSE in a Nutshell: The Windows 2000 Exams Published Feb. 2001. Excerpt http://proquest.safaribooksonline.com/0596000308/mcseian-CHP-13-SECT-1.

Memorandum Decision and Order Denying Defendant Centrify Corporation's Motion to Transfer Venue and Motion to Stay Pending Inter Partes Reexamination, *Quest Software, Inc.* v. *Centrify Corporation and Likewise Software, Inc.*, Case No. 2:10-cv-00859-TS, United States District Court for the District of Utah, Central Division.

Memorandum in Support of Centrify's Motion to Stay Pending Inter Partes Reexamination, *Quest Software, Inc.* v. *Centrify Corporation and Likewise Software, Inc.*, Case No. 2:10-cv-00859-TS, United States District Court for the District of Utah, Central Division.

Microsoft Corp., Implementing Registry-Based Group Policy for Applications, 2000.

Microsoft Corp., Introduction to Group Policy in Windows Server 2003, 2003.

Microsoft: CATIA Migration from UNIX to Windows, Overview, Jul. 18, 2003. (3 pages).

Microsoft: CATIA Migration from UNIX to Windows, Overview, Jul. 18, 2003, Microsoft, Chapter 8, Windows-Unix Interoperability and Data Sharing. (21 pages).

Mikkonen, H. et al., "Federated Identity Management for Grids" Networking and Services, 2006. ICNS '06. International conference on Jul. 16-18, 2006 pp. 69-69.

Mont, M.C. et al., "Towards accountable management of identity and privacy: sticky policies and enforceable tracing services", Database and Expert Systems Applications, 2003. Proceedings. 14th International Workshop on Sep. 1-5, 2003 pp. 377-382.

NCSA Introduction to Kerberos 5, All right reserved Board of Trustees of the University of Illinois Page last updated May 21, 2002 http://www.ncsa.uiuc.edu/UserInfo/Resources/Sofiware/kerberosold/introduction.html.

Neuman et al., "RFC 4120—The Kerberos Network Authentication Service V5," Network Working Group, Jul. 2005.

Neuman, et al.: "Kerberos: An Authentication Service for Computer Networks", IEEE Communications Magazine, vol. 32, Issue 9, Pub. Date Sep. 1994, relevant pp. 33-38.

Phiri, J. et al., "Modelling and Information Fusion in Digital Identity Management Systems" Networking, International Conference on Systems and International Conference on Mobile Communications and Learning Technologies, 2006. ICN/ICONS/MCL 2006. International Conference on Apr. 23-29, 2006 pp. 181-181.

Quest Software, Inc.'s Opposition to Motion to Stay, *Quest Software, Inc.* v. *Centrify Corporation and Likewise Software, Inc.*, Case No. 2:10-cv-00859-TS, United States District Court for the District of Utah, Central Division.

Quest Software; "UNIX Identity Migration Wizard User Guide", 2006.

Quest Vintela Authentication Services Administrator's Guide Version 3.1, Sep. 2006.

Radeke, E., et al. "Framework for object migration in federated database systems", Cooperation Univ. of Paderborn, Germany, Parallel and Distributed Information Systems, 1994., Proceedings of the Third International Conference on Publication Date: Sep. 28-30, 1994, on pp. 187-194.

Reply Memorandum in Support of Centrify's Motion to Stay Pending Inter Partes Reexamination, *Quest Software, Inc.* v. *Centrify Corporation and Likewise Software, Inc.*, Case No. 2:10-cv-00859-TS, United States District Court for the District of Utah, Central Division.

RFC 4120—"The Kerberos Network Authentication Service V5," Neuman et al., Network Working Group, Jul. 2005.

Sandrasegaran, Hsang, Identity Management in Vertical Handovers for UMTS-WLAN Networks, 2005 IEEE.

Search Security, "Search Security.com Definitions", Jun. 4, 2007, http://searchsecurity.techtarget.com/sDefinition/0,,sid14_gci212437,00.html.

Shim, S.S.Y et al., "Federated identity management" Computer; vol. 38, Issue 12, Dec. 2005 pp. 120-122.

Shin, D. et al "Ensuring information assurance in federated identity management", Performance, Computing, and Communications, 2004 IEEE International Conference on 2004 pp. 821-826.

Siddiqi, J. et al., "Secure ICT Services for Mobile and Wireless Communications: A Federated Global Identity Management Framework", Information Technology: New Generations, 2006. ITNG 2006. Third International Conference on Apr. 10-12, 2006 pp. 351-357.

Sixto Ortiz, Jr., "One-Time Password Technology", vol. 29, Issue 15, Apr. 13, 2007, http://www.processor.com/editorial/article.asp?article=articles%2Fp2915%2F30p15%2F30p15.asp.

Stipulated Judgment and Entry of Permanent Injunction against Likewise Software, Inc., *Quest Software, Inc.* v. *Centrify Corporation and Likewise Software, Inc.*, Case No. 2:10-CV-00859-TS, United States District Court for the District of Utah, Central Division.

Subject 2.15. What do I need to do to setup cross-realm authentication?, http://www.cmf.nrl.navy.mil/CCS/people/kenh/kerberos-fag.html. Jul. 8, 2010.

The SLAPD and SLURPD Administrator's Guide, University of Michigan Release 3.3 Apr. 30, 1996, available at http://www.umich.edu/~dirsvcs/ldap/doc/guides/slapd/guide.pdf.

Transcript of Jul. 22, 2011 deposition of Michael W. Dennis in *Quest Software, Inc.* v. *Centrify Corporation and Likewise Software, Inc.*, Case No. 2: 10-CV-00859-TS, United States District Court for the District of Utah, Central Division.

Turbo Fredriksson, "LDAPv3." printed from http://www.bayour.com/LDAPv3-HOWTO.html, pp. 2-65, 2001.

U.S. Appl. No. 95/001,458, Inter Partes Reexamination Request of co-owned U.S. Patent No. 7,617,501.

Vintela Group Policy Technology Preview, "Extending the Power of Group Policy and Windonws Active Directory to configuration of Unix and Linux users and systems", Version 0.1, May 2004.

Wedgetail Communications; "Security Assertion Markup Language (SAML)", 2004.

Weitzner, D.J., "In Search of Manageable Identity Systems", IEEE Internet Computing, vol. 10, Issue 6, Nov.-Dec. 2006 pp. 84-86.

Windows 2000 Kerberos Authentication White Paper, Microsoft Windows 2000 Server, pp. 1-5 and 41-42. Jul. 12, 2010.

Authentication, from Pieces of the Puzzle, Chapter 2, p. 12. (Exhibit IV to U.S. Appl. No. 95/001,872, Inter Partes Reexamination Renewed Petition (Third Party Requester to Response to Mar. 1, 2012 Office Action), dated Aug. 9, 2012.

Claim Chart, *Claim 1* vs. *Hemsath et al.*, Garman and Withers (Exhibit II to U.S. Appl. No. 95/001,872, Inter Partes Reexamination Renewed Petition (Third Party Requester to Response to Mar. 1, 2012 Office Action), dated Aug. 9, 2012.

IBM SecureWay Policy Director, 1999. (4 pages).

IBM z/OS V1R1.0-V1R12.0 DCE Application Development Reference: dce_acl_is_client_authorized API call: URL: http://publib.boulder.ibm.com/infocenter/zos/v1r12/topic/com.ibm.zos.r12.euvmd00/euva6a00646.htm, Copyright IBM Corporation 1990,2010, (2 pages).

O'Reily publications "Unix & Internet Security", Apr. 1996. (3 pages).

U.S. Appl. No. 95/001,872, Inter Partes Reexamination Renewed Petition (Third Party Requester to Response to Mar. 1, 2012 Office Action), dated Aug. 9, 2012.

U.S. Appl. No. 11/928,887, Inter Partes Reexamination Request dated Apr. 18, 2012.

U.S. Appl. No. 11/928,887, Inter Partes Reexamination Request dated Jul. 17, 2012.

USPTO Patent Full-Text and Image Database, Search for "ISD/Aug. 22, 1978->Dec. 19, 2005 and 'biometric authentication'", (Exhibit III to U.S. Appl. No. 95/001,872, Inter Partes Reexamination Renewed Petition (Third Party Requester to Response to Mar. 1, 2012 Office Action), dated Aug. 9, 2012.

\* cited by examiner

IDENTITY MIGRATION APPARATUS AND METHOD

This application is a continuation of U.S. application Ser. No. 11/928,887, entitled "Identity Migration Apparatus and Method, filed Oct. 30, 2007, which claims priority to U.S. Provisional Application No. 60/863,569 entitled "Identity Migration System Apparatus and Method" filed on Oct. 30, 2006, the entireties of which are hereby incorporated herein by reference to be considered part of this specification.

BACKGROUND OF THE INVENTION

1. Field of the Invention

The present invention relates to migrating network identities. Specifically, the invention relates to computer program products and methods for migrating network identities to a centralized management server.

2. Description of the Related Art

A single organization may have multiple computer networks. For example, a business may have a separate network for the Human Resources department, the Accounting department, and the Sales department. For a single user to log on to each network, the user must have a user identity registered with each network. As the number of network identities increases, so does the difficulty of managing the identities and the difficulty for each employee to remember their user identification information. Consequently, consolidating identities from multiple networks into a single management system is beneficial.

SUMMARY OF THE INVENTION

The present invention has been developed in response to the present state of the art, and in particular, in response to the problems and needs in the art that have not yet been fully solved by currently available identity migration solutions. Accordingly, the present invention has been developed to provide an apparatus and a method to centralize identity management that overcome many or all of the above-discussed shortcomings in the art.

In one aspect of the present invention, a method to centralize identity management includes the operations of providing one or more interface controls, and receiving and validating data to enable a user to create a migration project, specify locally-managed identities to be migrated to centrally-managed identities, specify migration rules for the migration project, and specify a schedule for the migration project. The method also includes migrating the selected identities according to the specified rules and schedule. The method may also include the operation of providing an interface controls to modify the migration rules to resolve identity migration errors.

In certain embodiments, the method may include the operation of providing interface controls to enable a user to communicate an identity map to at least one server, specify accounts to be included in an account group, manually correct identity migration errors, and to halt, roll back, and resume a migration process.

In another aspect of the present invention, an apparatus to centralize identity management is presented. In certain embodiments, the apparatus includes a project management module that provides one or more interface controls that enable a user to create a migration project, and an identity selection module that provides one or more interface controls that enable a user to specify locally-managed identities to be migrated to centrally-managed identities. The apparatus also includes a migration rule editor control that provides interfaces to enable a user to specify migration rules for the project that specify how the locally-managed identities are to be migrated to centrally-managed identities. The migration rule editor may also enable the user to modify existing migration rules to resolve identity migration errors. The apparatus may also include a scheduling module that provides one or more interface controls that enable a user to schedule the migration project.

In certain embodiments, the apparatus includes a communication module that retrieves locally-managed identities from at least one server. The communication module may also provide an interface control that enables a user to communicate an identity map to one or more servers, and communicate the identity map to the specified server(s). The apparatus may also include a group management module that provides one or more interface controls that enable a user to specify accounts to be included in an account group, and an account mapping module that provides one or more interface controls that enable a user to manually correct identity migration errors. The apparatus may also include a migration process management module that provides interface controls that enables a user to halt a migration process, roll back a migration process, or resume a migration process.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a screenshot diagram of one embodiment of an identity migration rule editor interface in accordance with the present invention;

DETAILED DESCRIPTION OF THE PREFERRED EMBODIMENT

Figure 1:
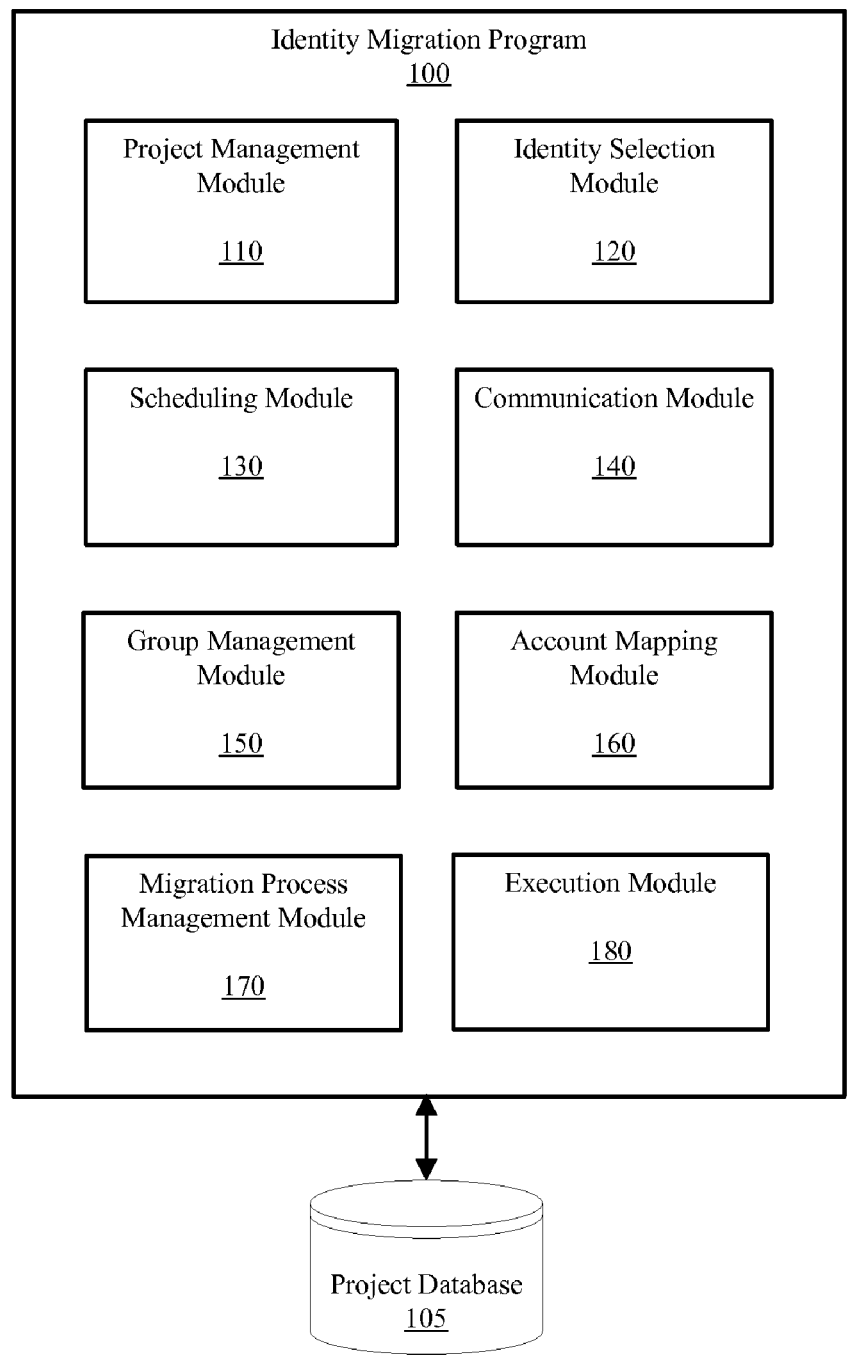
FIG. 1 is a block diagram of one embodiment of an identity migration program apparatus in accordance with the present invention.

It will be readily understood that the components of the present invention, as generally described and illustrated in the Figures herein, may be arranged and designed in a wide variety of different configurations. Thus, the following more detailed description of the embodiments of the apparatus and method of the present invention, as represented in the attached Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The features, structures, or characteristics of the invention described throughout this specification may be combined in any suitable manner in one or more embodiments. For example, reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," or similar language throughout this specification do not necessarily all refer to the same embodiment and the described features, structures, or characteristics may be combined in any suitable manner in one or more embodiments.

Turning now to the figures, FIG. 1 is a block diagram of one embodiment of an identity migration program 100 and associated datastore 105 in accordance with the present invention. The identity migration program 100 a project management module 110, an identity selection module 120, a scheduling module 130, a communication module 140, a group management module 150, an account mapping module 160, a migration process management module 170, and an execution module 180. The identity migration program 100 facilitates migrating locally-managed identities to centrally-managed identities. The modules of the identity migration program 100 may be located on a single computer or distributed among various computing components within an enterprise.

The project datastore 105 is the repository for data related to migration projects. In the depicted embodiment, the project datastore 105 is a database. In one embodiment, the project datastore 105 receives data from the communication module 140 that was received by the various modules of the identity migration program 100, whether entered by users or gathered from locally-managed or centrally-managed servers. In one embodiment, the project datastore 105 archives copies of identity migration maps distributed to locally-managed or centrally-managed servers.

The project management module 110 accepts input, validates the received data, and stores data associated with managing identity migration projects. In various embodiments, data collected by the project management module 110 includes a project name, a project description, and credentials for authenticating to source and target systems. The project management module 110 may receive project-related data from other modules of the identity migration program 100 to be stored in a project data store 105 or the like.

The identity selection module 120 facilitates selecting locally-managed identities to be migrated to centrally-managed identities. In one embodiment, the identity selection module 120 provides interface controls, and receives and validates input from the user directing the identity migration program 100 to search for locally-managed computers on a network and extract identity information from the computers. The identity selection module 120 may utilize the communication module 140 to fulfill the user requests, display identity data retrieved by the communication module 140, and accept input from the user to select identities to be migrated.

The scheduling module 130 facilitates scheduling of identity migration projects. In one embodiment, the scheduling module 130 provides interface controls to run an identity migration project immediately, at a specified time in the future, or on a periodic schedule. In one embodiment, the scheduling module 130 utilizes features of the host operating system to schedule the migration project. In another embodiment, the scheduling module 130 registers the project with a background ("daemon") process that directs the execution module 180 to executes the scheduled migration project.

The communication module 140 manages communication between modules of the identity migration program 100 and various external entities. In one embodiment, the communication module 140 receives requests from the identity selection module 120 to retrieve identities from locally-managed computers specified by a user. In one embodiment, the communication module 140 receives identities from migration agents located on locally-managed systems. The communication module 140 may communicate an identity map to a server. In one embodiment, the communication module 140 displays an interface control that enables the user to select a server to which the identity map is to be communicated. In various embodiments, the communication module 140 retrieves data required by the various modules of the identity migration program 100, such as group membership data, identity attributes, resources associated with an identity, or the like. In various embodiments, the communication module 140 may communicate identity maps to migration agents on locally-managed or centrally-managed servers. The communication module 140 may also communicate with an external database configured to store migration project data.

The group management module 150 provides an interface control that enables the user to specify locally-managed accounts to be migrated to centrally-managed account groups. In one embodiment, the group management module 150 migrates locally-managed account groups to centrally-managed account groups in an automated process not requiring direct user input. One skilled in the art, however, will recognize that identity groups are conceptually different in various identity management and directory services systems, and identity group migration is best accomplished with user input. For example, Active Directory groups are hierarchical and different permissions can be granted at different nesting levels. UNIX groups cannot be nested. Active Directory groups have security identities (SID) that are guaranteed to be unique across an enterprise. The UNIX group ID (GID) is an integer that can easily coincide with the IDs of groups in other source repositories.

The account mapping module 160 provides an interface control to manually correct identity migration errors. Application of identity migration rules may result in multiple accounts belonging to the same person with different IDs, or identities belonging to multiple users may be migrated to the same account. When many of these identity migration errors occur, the most efficient approach may be to modify identity migration rules to produce fewer migration errors. When few migration errors occur, the most efficient approach may be to manually correct the errors and map locally-managed identities to the correct centrally-managed identities. In one embodiment, the account mapping module 160 displays a list of locally-managed identities and the centrally-managed identities to which they are mapped. The account mapping module 160 may also provide interface controls to unmap a locally-managed identity from a centrally-managed identity and remap it to a different identity or to create a new identity to which to map it.

The migration process management module 170 provides interface controls that enable the user to monitor and control the status of migration projects. In one embodiment, the migration process management module 170 provides a control to enable the user to specify conditions that cause the migration process to be interrupted. The user may then check the progress of the migration project and execute other programs to perform necessary operations not performed by the identity migration program 100. The migration process management module 170 then provides a control to resume the migration project. In one embodiment, the migration process management module 170 provides controls to verify, commit, or roll back a migration project.

The execution module 180 executes the migration project according to the migration rules and schedule specified for the project. In one embodiment, the execution module comprises processes distributed among various computing components within an enterprise, such as locally-managed servers, a migration server, and centrally-managed servers.

Figure 2:
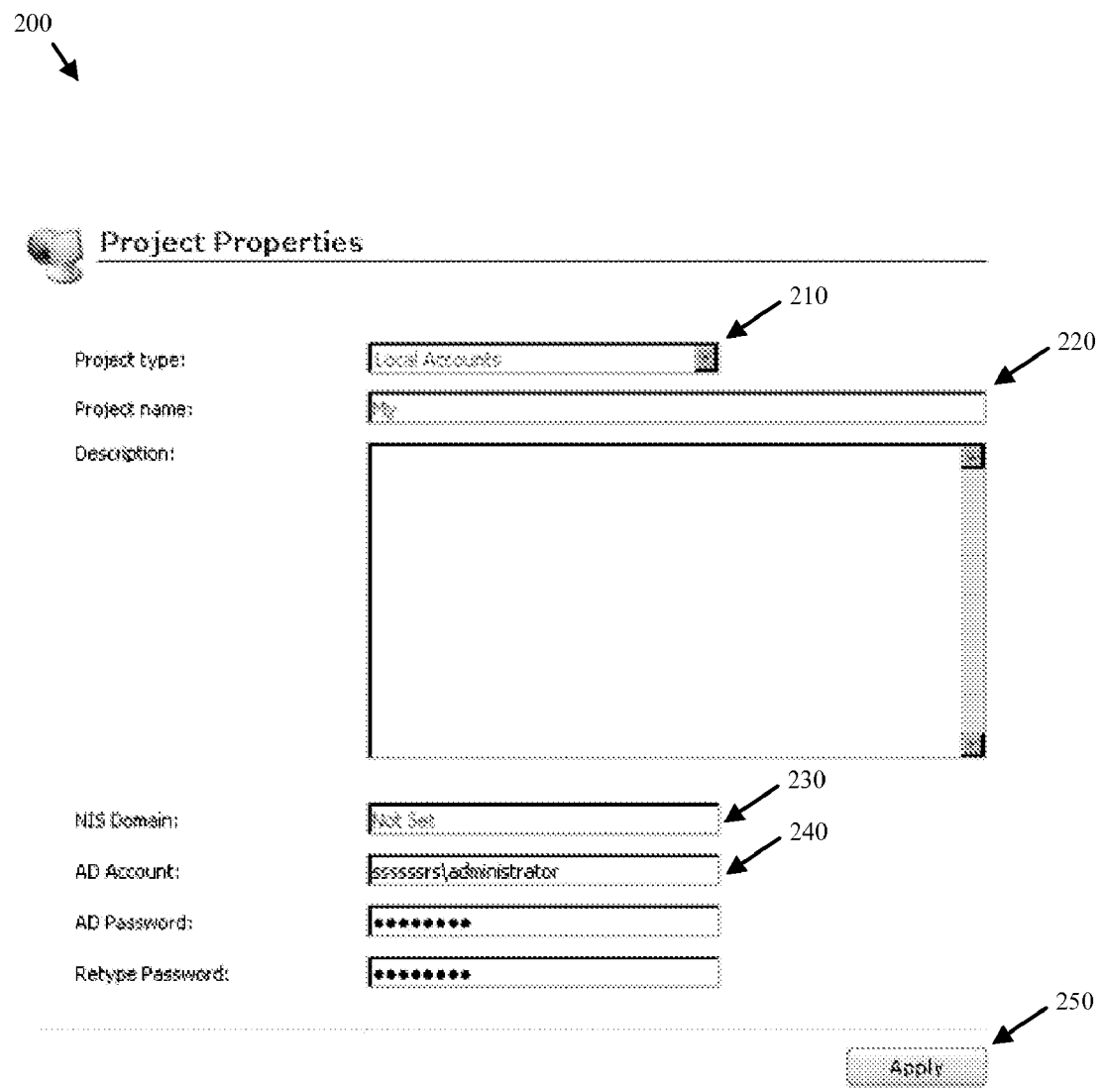
FIG. 2 is a screenshot diagram of one embodiment of an identity migration project management interface in accordance with the present invention.

FIG. 2 is a screenshot diagram of one embodiment of an identity migration project management interface 200 in accordance with the present invention. The identity migration project management interface 200 includes a project type control 210, a project name control 220, an account domain control 230, credential controls 240, and a project creation control 250. The identity migration project management interface 200 facilitates management of identity management projects.

In various embodiments, the identity migration project management interface 200 is implemented as a wizard or a single dialog with controls such as drop-down menus, text boxes, radio buttons, check boxes, combo boxes, or the like. In the embodiment depicted in FIG. 2, the project type control 210 is a drop-down menu that enables the user to select from a predefined set of project types. The project name control 220 is a text box in which the user may enter a name for the project. The account domain control 230 is a text box in which the user may enter the name of the NIS domain from which identities are to be migrated. The credential controls 240 receive the account ID and password to be used to authenticate to the specified domain. When all the necessary information has been entered, the user may activate the project creation control 250 to apply the specified parameters.

Figure 3:
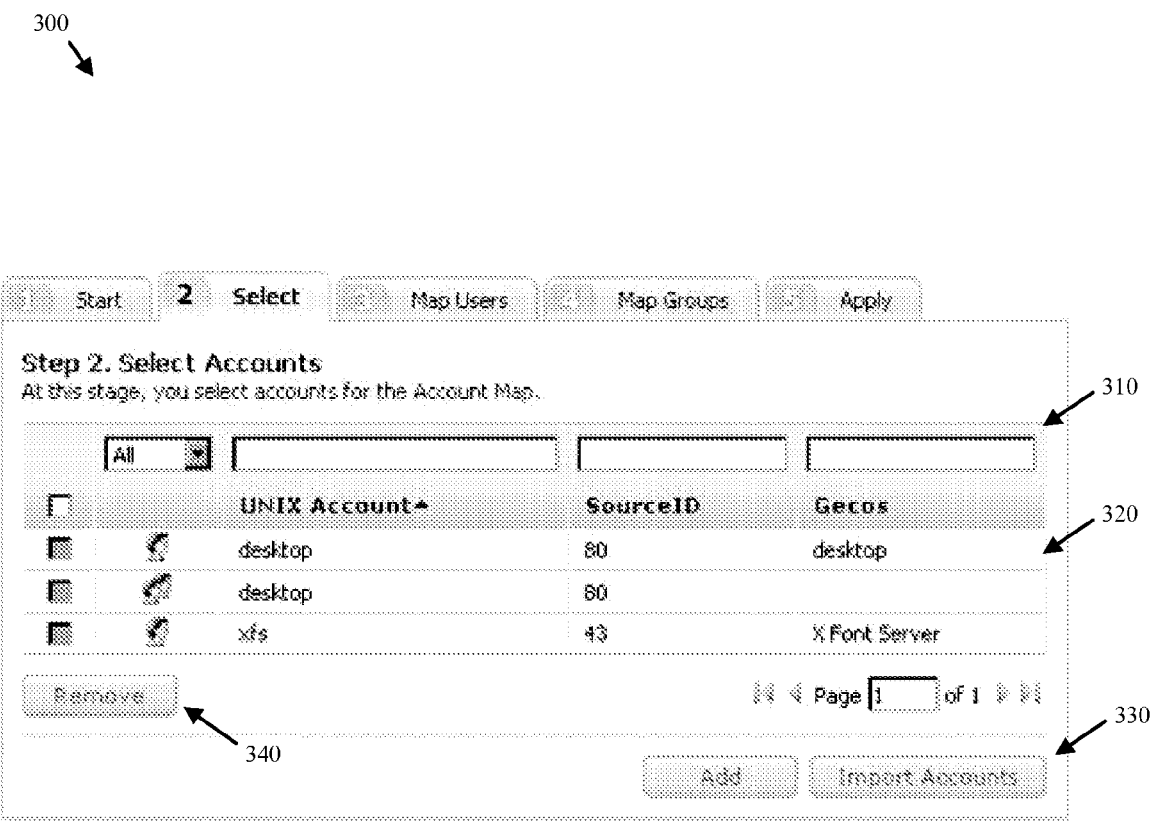
FIG. 3 is a screenshot diagram of one embodiment of an identity selection interface in accordance with the present invention.

FIG. 3 is a screenshot diagram of one embodiment of an identity selection interface 300 in accordance with the present invention. The identity selection interface 300 includes an identity search control 310, an identity list control 320, an identity inclusion control 330, and an identity exclusion control 340. The identity selection interface 300 facilitates the selection of locally-managed identities to be migrated to centrally-managed identities.

In the embodiment depicted in FIG. 3, the user may employ the identity search control 310 to search for locally-managed identities to be migrated. The identity list control 320 displays discovered identities. The user may select identities from the identity list control 320 to be excluded from the migration project by activating the identity exclusion control 340. When identities to be migrated have been added to the identity list control 320, the user may activate the identity inclusion control 330 to add the identities to the migration project.

Figure 4:
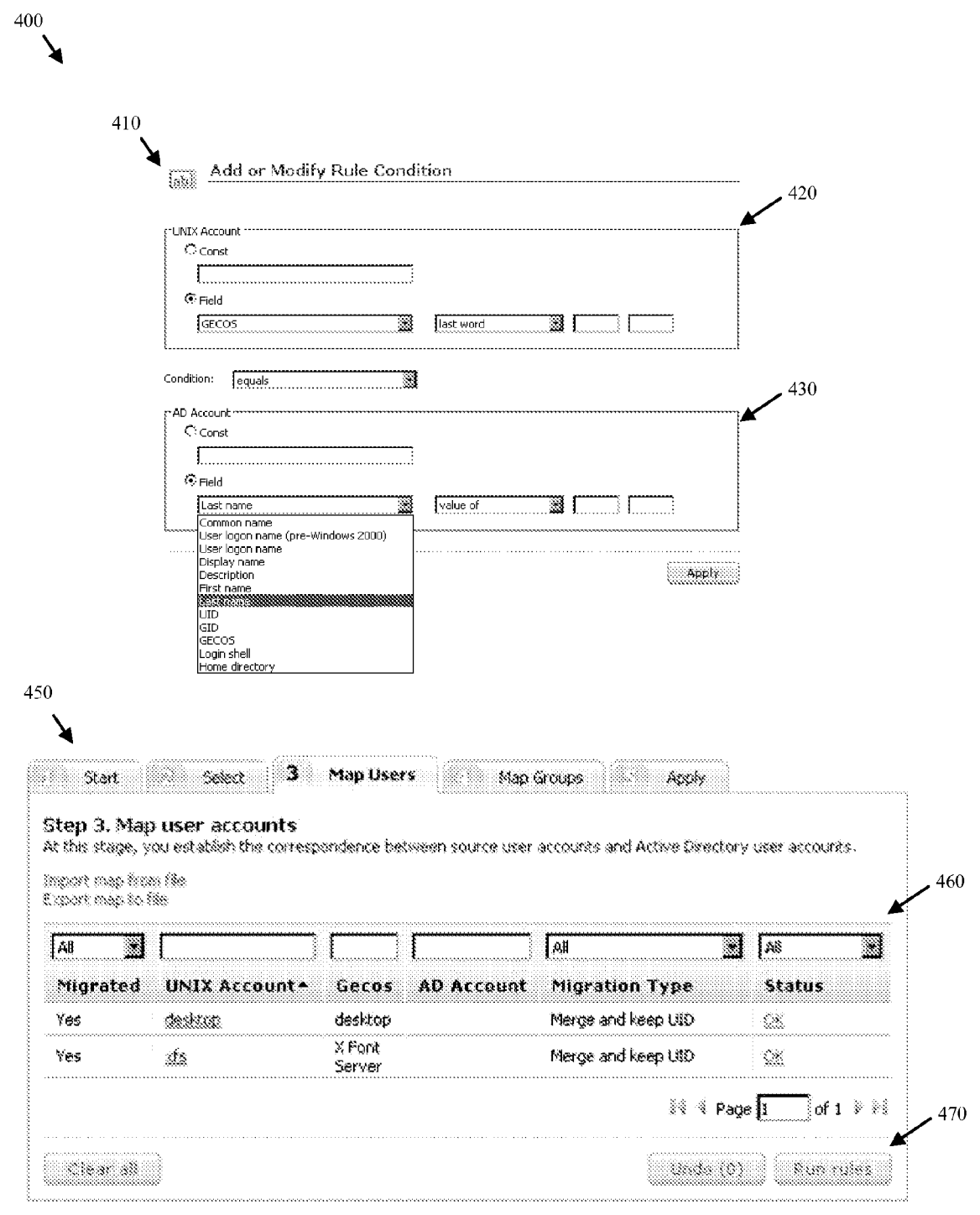

FIG. 4 is a screenshot diagram of one embodiment of an identity migration rule editor interface 400 in accordance with the present invention. The identity migration rule editor interface 400 includes a migration rule condition editor dialog 410 and an identity mapping dialog 450. The migration rule condition editor dialog 410 includes a locally-managed identity selection control 420 and a centrally-managed identity selection control 430. The identity mapping dialog 450 includes an identity selection control 460 and an identity migration rule execution control 470. The identity migration rule editor interface 400 facilitates creating and editing rules governing the migration of locally-managed identities to centrally-managed identities.

In the embodiment depicted in FIG. 4, the user may utilize the migration rule condition editor dialog 410 to edit conditions under which locally-managed UNIX identities are migrated to centrally-managed Active Directory identities. Rules may also specify which properties are migrated with the identities. The locally-managed identity selection control 420 describes properties of the locally-managed identity to be mapped to corresponding properties selected in the centrally-managed identity selection control 430. In the depicted embodiment of the identity mapping dialog 450, the user may employ the identity selection control 460 to specify the mapping between locally-managed identities and centrally-managed identities. When the mappings are complete, the user may activate the identity migration rule execution control 470 to execute the specified rule set.

Figure 5:
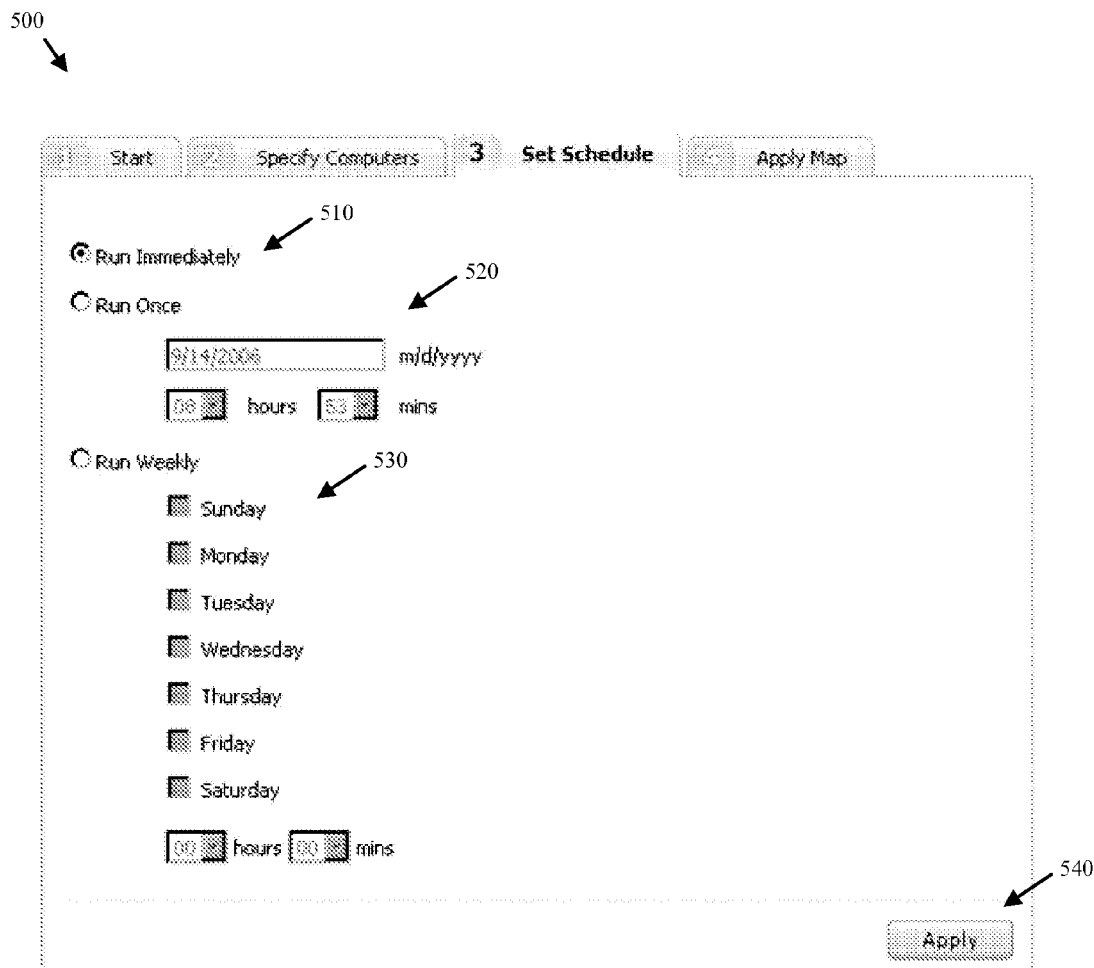
FIG. 5 is a screenshot diagram of one embodiment of an identity migration scheduling interface in accordance with the present invention.

FIG. 5 is a screenshot diagram of one embodiment of an identity migration scheduling interface 500 in accordance with the present invention. The identity migration scheduling interface 500 includes a run immediately control 510, a one-time execution scheduling control 520, a repeated execution scheduling control 530, and a schedule application control 540. The identity migration scheduling interface 500 facilitates the scheduling of one-time or repeated execution of identity management projects.

In the embodiment of the identity migration scheduling interface 500 depicted in FIG. 5, the run immediately control 510 is a radio button that the user may select to execute the migration project immediately. The one-time execution scheduling control 520 includes controls to specify a date and time at which the migration project is to be executed. The repeated execution scheduling control 530 enables the user to specify a day of the week and time at which the migration project will be executed on a weekly basis. When the user has selected a scheduling option and entered the associated parameters, the scheduling option may be activated using the schedule application control 540. In one embodiment, the identity migration scheduling interface 500 provides interface controls to schedule phases or processes of the migration project according to separate schedules.

Figure 6:
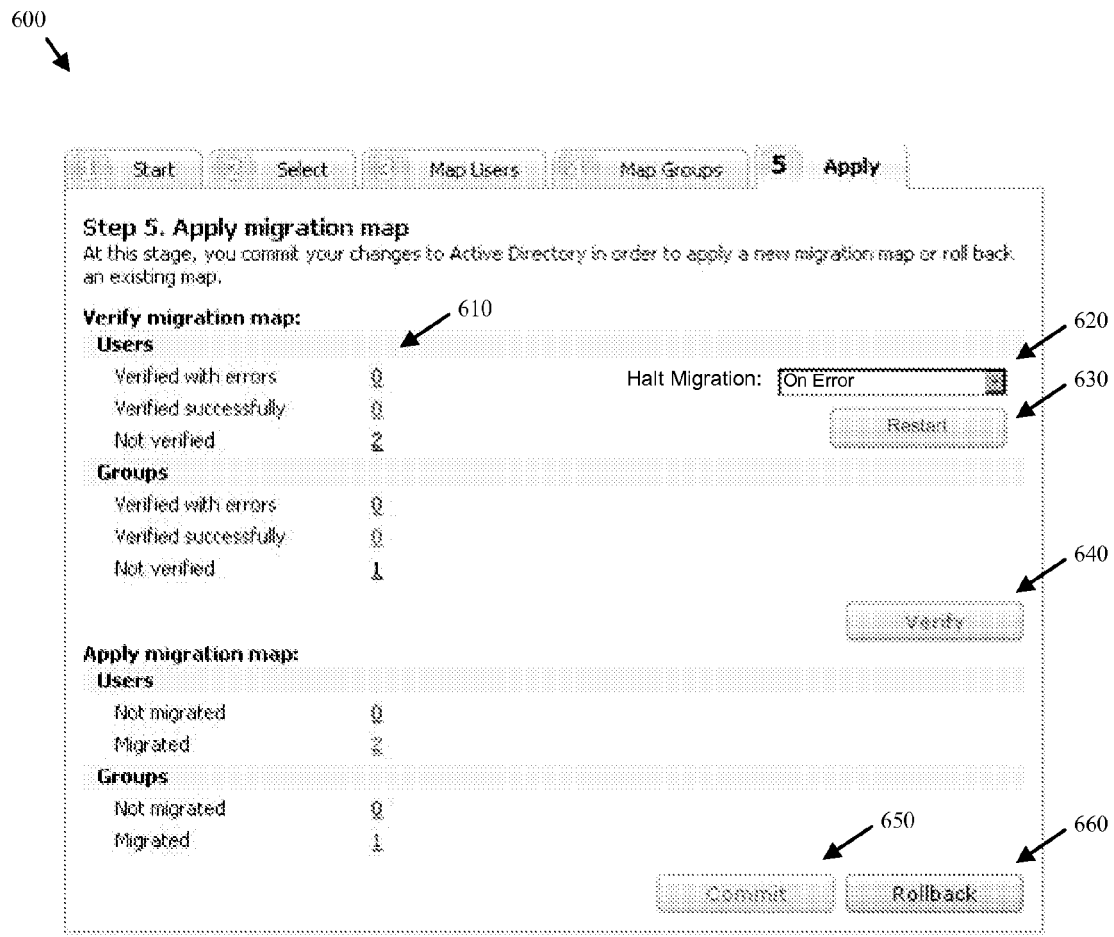
FIG. 6 is a screenshot diagram of one embodiment of an identity migration process control interface in accordance with the present invention.

FIG. 6 is a screenshot diagram of one embodiment of an identity migration process control interface 600 in accordance with the present invention. The identity migration process control interface 600 includes a migration map verification status control 610, a halt migration condition control 620, a resume migration control 630, a migration map verification control 640, a commit migration map control 650, and a migration rollback control 660. The identity migration process control interface 600 facilitates control of the identity migration process.

The depicted embodiment of the identity migration process control 600 enables the user to monitor and control the progress of a migration project. The migration map verification status control 610 displays the status of identities being migrated. The halt migration condition control 620 enables the user to specify conditions that cause the migration process to be interrupted. The user may then check the progress of the migration project and execute other programs to perform necessary operations not performed by the identity migration program 100. The user may then use the resume migration control 630 to resume execution of the migration project. The depicted embodiment includes a migration map verification control 640, a commit migration map control 650, and a migration rollback control 660 to respectively verify, commit, or roll back operation of the migration project.

Figure 7:
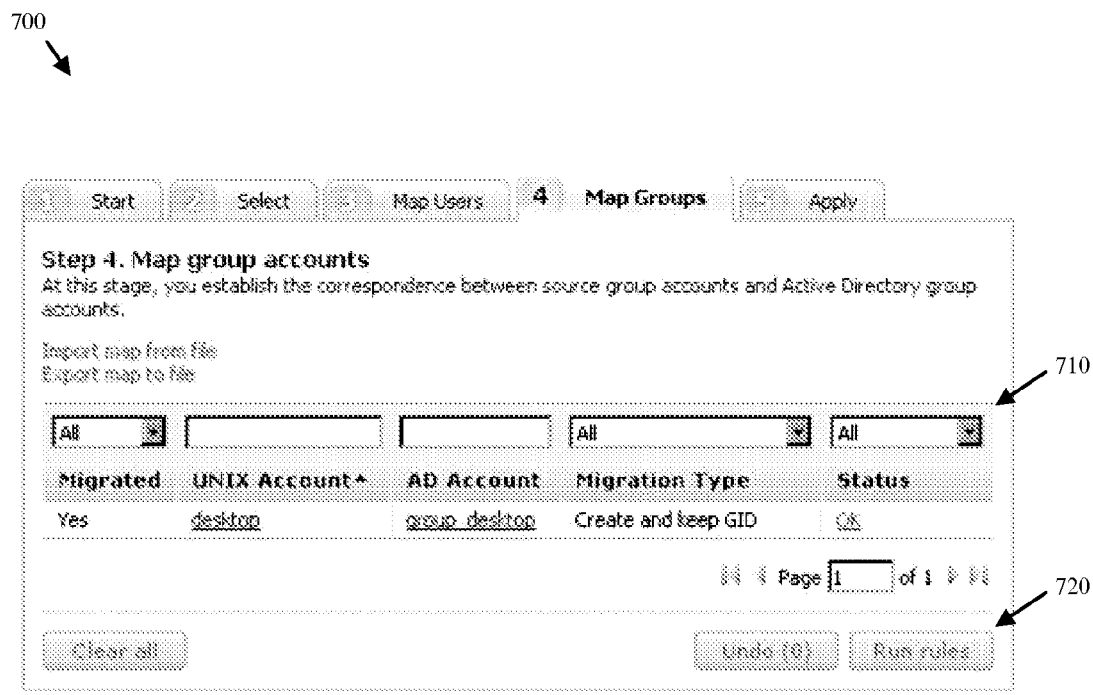
FIG. 7 is a screenshot diagram of one embodiment of an identity group migration interface in accordance with the present invention.

FIG. 7 is a screenshot diagram of one embodiment of an identity group migration interface 700 in accordance with the present invention. The identity group migration interface 700 includes a group selection control 710 and a group migration rule execution control 720. The identity group migration interface 700 facilitates migration of locally-managed identity groups to centrally-managed identity groups.

In the depicted embodiment, the user may utilize the group selection control 710 to map locally-managed UNIX groups to centrally-managed Active Directory groups. When the group mappings have been specified, the user may activate the group migration rule execution control 720 to apply the specified rule set.

Figure 8:
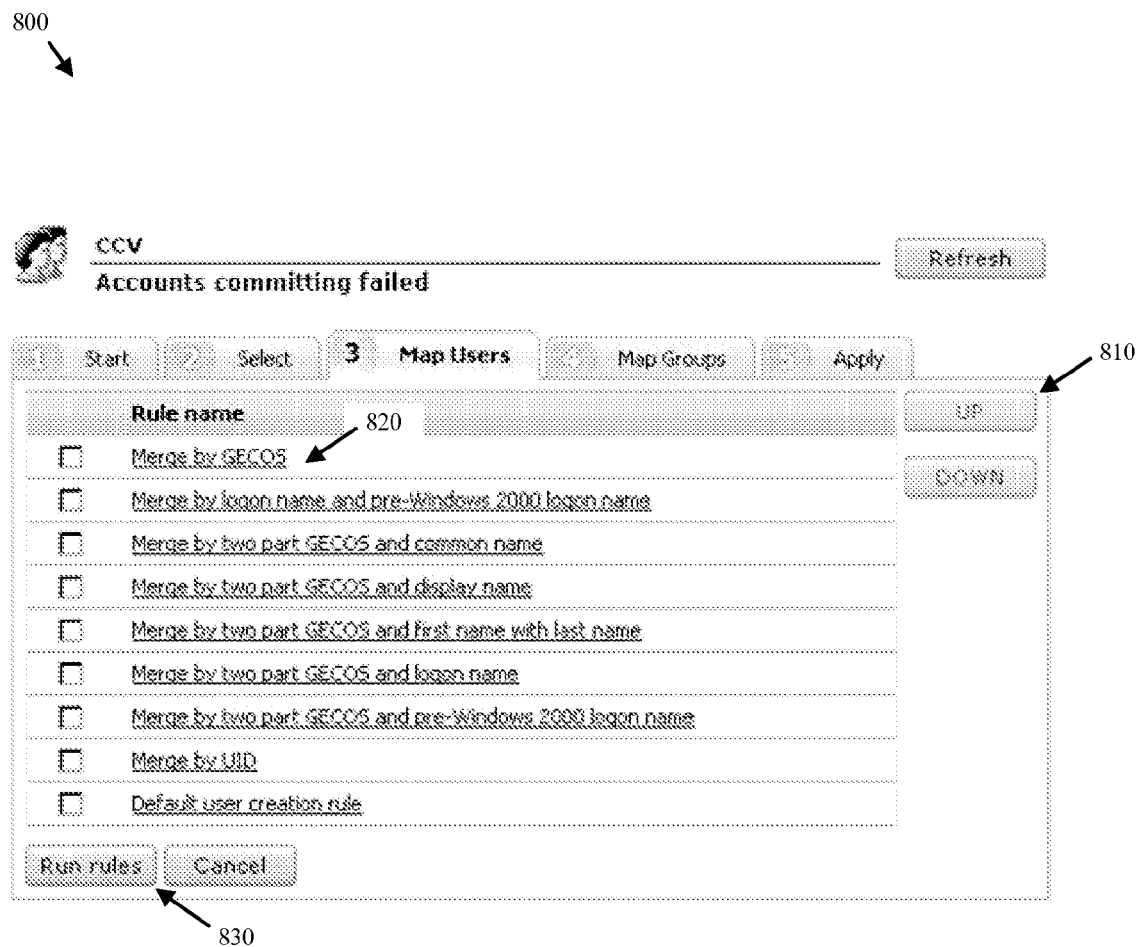
FIG. 8 is a screenshot diagram of one embodiment of an identity migration rule correction interface in accordance with the present invention.

FIG. 8 is a screenshot diagram of one embodiment of an identity migration rule correction interface 800 in accordance with the present invention. The identity migration rule correction interface 800 includes a rule execution order control 810, a rule list control 820, and a rule execution control 830. The identity migration rule correction interface 800 facilitates correction of identity migration rules.

In the depicted embodiment, the rule list control 820 displays the migration rules included in the migration project, in the order in which they are to be executed. The user may select rules from the list and change the order in which they are to be executed using the rule execution order control 810. When the rules are in the desired order, the user may execute the migration rules by activating the rule execution control 830. By modifying the order in which rules are applied, the migration project can be adjusted to yield fewer identity migration errors.

Figure 9:
FIG. 9 is a screenshot diagram of one embodiment of a manual identity mapping interface in accordance with the present invention.

FIG. 9 is a screenshot diagram of one embodiment of a manual identity mapping interface 900 in accordance with the present invention. The manual identity mapping interface 900 includes an identity selection control 910, and identity list control 920, an identity map completion control 930, and an identity group control 940. The manual identity mapping interface 900 facilitates manually mapping locally-managed identities to centrally-managed identities.

The user may utilize the depicted embodiment of the manual identity mapping interface to manually correct identity migration errors in an identity migration project. The user may search for locally-managed identities using the identity selection control 910. Discovered identities are displayed in the identity list control 920. Group membership may be preserved by selecting options in the identity group control 940. When the identity mapping is complete, the user may add the specified identity mappings by activating the identity map completion control 930.

Figure 10:
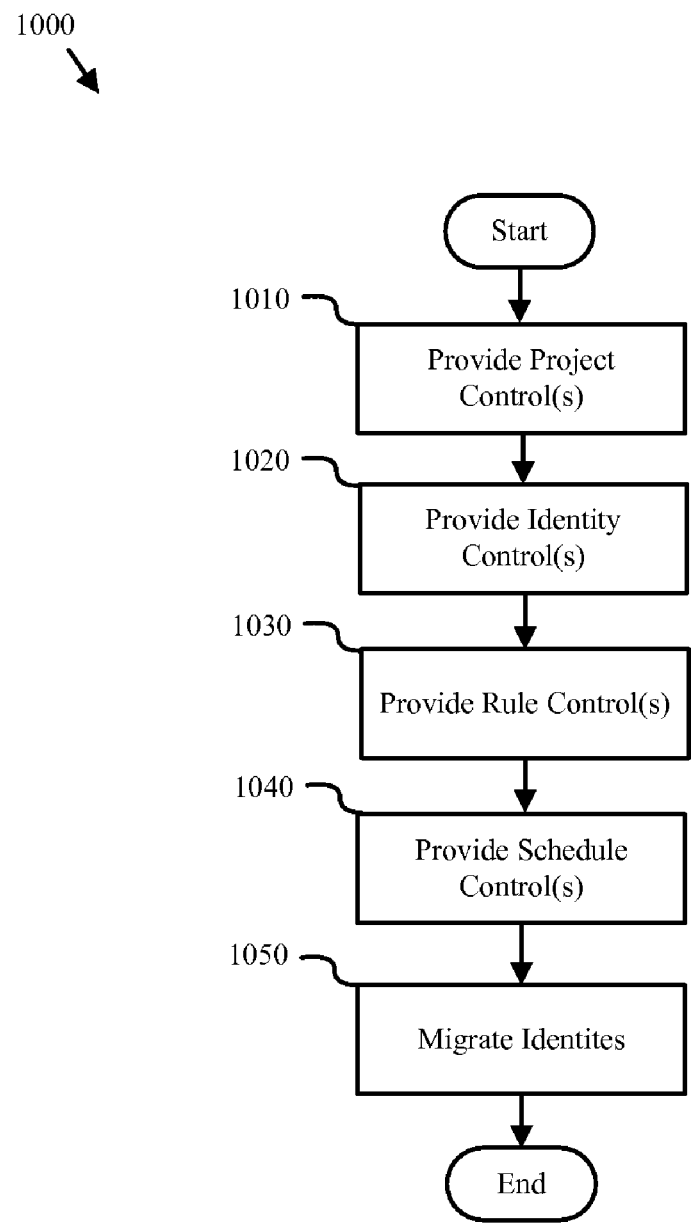
FIG. 10 is one embodiment of a method to migrate locally-managed identities to centrally-managed identities in accordance with the present invention.

FIG. 10 is one embodiment of an identity migration method 1000 in accordance with the present invention. The identity migration method 1000 includes a provide project control(s) operation 1010, a provide identity control(s) operation 1020, a provide rule control(s) operation 1030, a provide schedule control(s) operation 1040, and a migrate identities operation 1050. The identity migration method 1000 facilitates the migration of locally-managed identities to centrally-managed identities.

In the depicted embodiment of the identity migration method 1000, the specified controls are displayed to gather the associated parameters for the identity migration project. Although the operation of the identity migration method 1000 are displayed in a sequential order, the user may enter the required information in any order, so long as all the required parameters are entered before the migrate identities operation 1050 is executed by the execution module 180 or the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for migrating locally-managed identities to centrally-managed identities, the method comprising:
    providing with computer hardware including at least one computer processor at least one interface control that enables a user to create a migration project;
    providing at least one interface control that enables a user to identify locally-managed identities associated with locally-managed account groups;
    providing at least one interface control that enables a user to specify a migration of the locally-managed account groups to one or more centrally-managed account groups such that the migration of the locally-managed account groups migrates the locally-managed identities associated with the locally-managed account groups to the one or more centrally-managed account groups and preserves local group membership information and identity attributes about the locally-managed identities migrated to the one or more centrally-managed account groups;
    providing at least one interface control that enables a user to specify migration rules for the migration project;
    providing at least one interface control that enables a user to specify a migration schedule for the migration project; and
    executing the migration rules with the computer hardware including the at least one computer processor according to the migration schedule to automatically migrate the locally-managed identities associated with the locally-managed account groups to the one or more centrally-managed account groups in a manner that preserves the local group membership information of migrated locally-managed identities.

2. The method of claim 1 further comprising providing at least one interface control that enables a user to modify at least one migration rule to manually correct an identity migration error.

3. The method of claim 1 further comprising providing at least one interface control that enables a user to halt a migration process specified by the migration project.

4. The method of claim 1 wherein the one or more centrally-managed account groups include one or more centrally-managed account groups in Active Directory.

5. The method of claim 1 wherein the locally-managed account groups include one or more locally-managed account groups in Unix.

6. A system for identity migration comprising:
    computer hardware including at least one computer processor; and
    a plurality of modules stored in computer-readable storage comprising computer readable instructions that, when executed by the computer processor, cause the computer hardware to perform operations defined by the computer-executable instructions, the modules configured to:
        provide at least one interface control that enables a user to create a migration project;
        provide at least one interface control that enables a user to identify locally-managed identities associated with locally-managed account groups;
        provide at least one interface control that enables a user to specify a migration of the locally-managed account groups to one or more centrally-managed account groups such that the migration of the locally-managed account groups migrates the locally-managed identities associated with the locally-managed account groups to the one or more centrally-managed account groups and preserves local group membership information and identity attributes about the locally-managed identities migrated to the one or more centrally-managed account groups;
        provide at least one interface control that enables a user to specify migration rules for the migration project;
        provide at least one interface control that enables a user to specify a migration schedule for the migration project; and
        execute the migration rules according to the migration schedule to automatically migrate the locally-managed identities associated with the locally-managed account groups to the one or more centrally-managed account groups in a manner that preserves the local group membership information of migrated locally-managed identities.

7. The system of claim 6 wherein the modules are further configured to provide at least one interface control that enables a user to roll back a migration process specified by the migration project.

8. The system of claim 6 wherein the modules are further configured to provide at least one interface control that enables a user to resume a migration process specified by the migration project.

9. The system of claim 6 wherein the modules are further configured to provide at least one interface control that enables a user to modify at least one migration rule to resolve identity migration errors.

10. The system of claim 6 wherein the modules are further configured to provide at least one interface control that enables a user to retrieve locally-managed identities from at least one server, provide at least one interface control that enables a user to communicate an identity map to at least one server, and communicate the identity map to at least one server in response to user activation of the at least one interface control.

11. A non-transitory computer readable storage medium comprising a program of machine-readable instructions executable by a digital processing apparatus to perform operations to migrate locally-managed identities to centrally-managed identities, the operations comprising:
    providing at least one interface control that enables a user to create a migration project;
    providing at least one interface control that enables a user to identify locally-managed identities associated with locally-managed account groups;
    providing at least one interface control that enables a user to specify a migration of the locally-managed account groups to one or more centrally-managed account groups such that the migration of the locally-managed account groups migrates the locally-managed identities associated with the locally-managed account groups to the one or more centrally-managed account groups and preserves local group membership information and identity attributes about the locally-managed identities migrated to the one or more centrally-managed account groups;

providing at least one interface control that enables a user to specify a plurality of migration rules for the migration project;

providing at least one interface control that enables a user to specify a migration schedule for the migration project; and executing the migration rules according to the migration schedule to automatically migrate the locally-managed identities associated with the locally-managed account groups to the one or more centrally-managed account groups in a manner that preserves the local group membership information of migrated locally-managed identities.

12. The non-transitory computer readable storage medium of claim 11 wherein the operations further comprise providing at least one interface control that enables a user to interrupt a migration process specified by the migration project.

13. The non-transitory computer readable storage medium of claim 11 wherein the operations further comprise providing at least one interface control that enables a user to resume a migration process specified by the migration project.

14. The non-transitory computer readable storage medium of claim 11 wherein the operations further comprise providing at least one interface control that enables a user to commit a migration process specified by the migration project.

15. The non-transitory computer readable storage medium of claim 11 wherein the operations further comprise providing at least one interface control that enables a user to unmap at least one locally-managed identity from at least one centrally-managed identity.

16. A method for migrating locally-managed identities to centrally-managed identities, the method comprising:

providing at least one interface control that enables a user to migrate locally-managed identities associated with locally-managed account groups to one or more centrally-managed account groups; and executing migration rules with computer hardware including at least one computer processor according to a migration schedule to automatically migrate the locally-managed identities associated with the locally-managed account groups to the one or more centrally-managed account groups in a manner that preserves the local group membership information of migrated locally-managed identities.

17. The method of claim 16 further comprising providing at least one interface control that enables a user to identify the locally-managed identities associated with the locally-managed account groups.

18. The method of claim 16 further comprising providing at least one interface control that enables a user to specify the migration rules for the migration project, and providing at least one interface control that enables a user to specify the migration schedule for the migration project.

19. The method of claim 16 wherein the one or more centrally-managed account groups include one or more centrally-managed account groups in Active Directory.

20. The method of claim 16 wherein the locally-managed account groups include one or more locally-managed account groups in Unix.

\* \* \* \* \*